United States Patent [19]

Meier

[11] 3,770,197
[45] Nov. 6, 1973

[54] ARRANGEMENT IN A HOT WATER-CIRCULATING HEATING SYSTEM

[75] Inventor: Hans Meier, Remscheid, Germany
[73] Assignee: Joh. Vaillant KG., Remscheid, Germany
[22] Filed: Apr. 17, 1972
[21] Appl. No.: 244,824

[30] Foreign Application Priority Data
Apr. 22, 1971 Germany.................. P 21 19 622.5

[52] U.S. Cl...................... 237/8 C, 237/19, 236/23
[51] Int. Cl............................................. F24d 3/08
[58] Field of Search...................... 237/8 C, 19, 8 D; 236/23

[56] References Cited
UNITED STATES PATENTS
3,426,971   2/1969   Meier................................ 237/8 D

*Primary Examiner*—William E. Wayner
*Attorney*—Howard H. Darbo et al.

[57] ABSTRACT

A gas burner heats water to be forced through radiators by a pump. A valve assembly on the forward or feed conduit has a connection going to the radiators and a connection going through a by-pass to the return conduit. In the by-pass conduit is a heat exchanger for heating water to be consumed. A temperature sensor on the assembly is exposed to and responsive to the unheated water to be consumed and the heated water in the forward conduit. This temperature sensor operates an electrical switch and, through a lost motion connection, operates the water flow valve in the valve assembly. When this sensor is cool the valve is set to cause the water in the forward conduit to flow through the by-pass and the electrical switch is closed. As the temperature sensor heats up its first opens the electrical switch and thereafter moves the valve to a position at which the heated water in the forward line flows to the radiators. For summer operation the gas burner and the pump are controlled through that switch. For winter operation that switch is by-passed and a room thermostat controls the electric supply to the gas valve and pump. Also included in the electrical circuits are switches responsive to the flow of water to be heated through the heat exchanger and water temperature limit switches.

8 Claims, 1 Drawing Figure

PATENTED NOV 6 1973　　　3,770,197
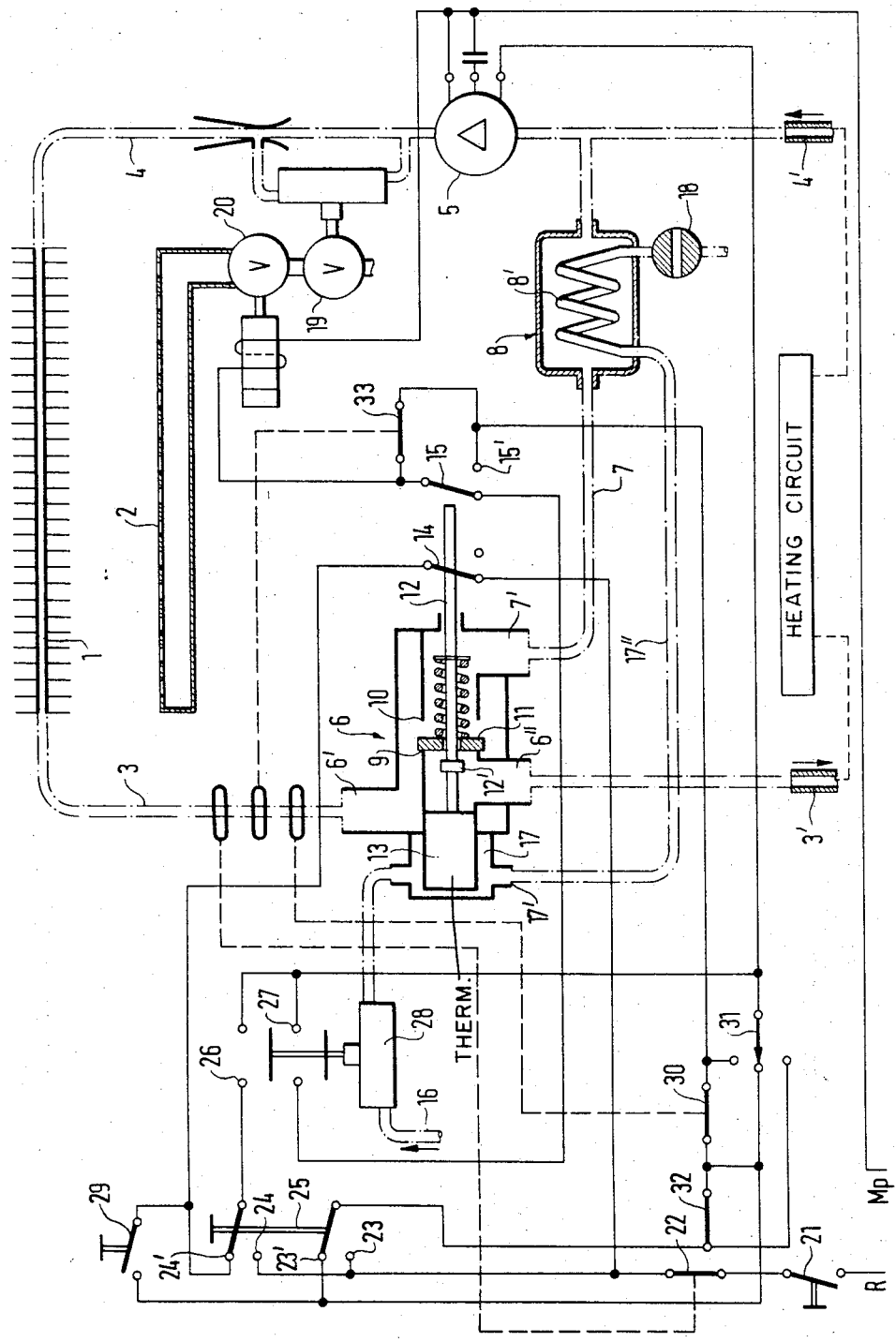

ARRANGEMENT IN A HOT WATER-CIRCULATING HEATING SYSTEM

BACKGROUND AND SUMMARY OF THE INVENTION

This invention relates to an improvement in a hot water circulating heating system comprising a heat exchanger which is shunt connected to the heating circuit between the forward and return conduits thereof and serves to heat water for consumption and a prior change-over valve assembly consisting of a thermostat valve having a temperature sensor which is exposed to the forward flow or return temperature and to the cold water temperature in the conduit for water for consumption. A greater influence is often exerted by the cold water temperature than by the forward flow or return temperature.

A change-over valve assembly is known which under electrical control directs the forward flow either to the heating circuit or to the shunt-connected heater for water for consumption. In this change-over valve assembly, the valve member consists of a thermostat and during the heating-up phase effects an admixing of the forward flow over the shunt-connected heater. It is also known to provide a temperature control by the thermostat sensor rather than an electrical control for the change-over valve assembly. For this purpose, the temperature sensor of the thermostat valve is included in a chamber through which flows the forward flow or the return flow and the sensor is surrounded by a pipe loop of the cold water supply conduit of the shunt-connected heater. During the operation of such arrangements in the summer, when a circulation of hot water is not desired and the system is used only to heat water for consumption, hot circulating water may temporarily enter the heating circuit when water for consumption is drawn. For this reason it has been proposed to provide an additional temperature sensor, which is exposed to the same temperature influences and which operates an electric thermostat switch for controlling the circulating pump and, by means of a solenoid valve, the supply of gas. When, in such arrangement, water for consumption is drawn while the temperature sensor of the thermostat valve is still hot owing to the retained heat, so that the thermostat valve is open, the thermostat switch temporarily prevents the energization of the circulating pump and the opening of the solenoid valve which controls the supply of gas. It has also been proposed to provide the thermostat switch in series with a flow pressure switch, which is responsive to a flow of water for consumption, the connection being such that the electrical circuit of the solenoid valve and of the circulating pump, which circuit is adapted to be closed by the flow pressure switch, is interrupted by the thermostat switch until the temperature sensors are not sufficiently cooled. The additional temperature is set to a lower threshold temperature so that the thermostat switch in the circuit of the pump and solenoid-controlled gas valve is opened before a valve which controls the passage of water to the heating circuit is opened.

It is an object of the invention to simplify a valve control system of the type mentioned last and to improve the control of the heater for circulating water.

In an arrangement of the kind first defined hereinbefore, the invention resides in that the temperature sensor is adapted also to operate switch means controlling the circulating pump and the supply of gas, and that the priority change-over valve assembly comprises a thermostatically operated valve controlling the passage to the heating circuit which is opened by a lost-motion stroke in such a manner that the opening of the valve does not begin until the opening of the switch means.

As a result, only a single temperature sensor is required which controls the valve of the priority change-over valve assembly and the switch means, whereas a lost-motion stroke ensures that the switch means will be sure to be opened before the valve begins to open.

In a development of the invention, the priority change-over valve assembly comprises a valve closure in the form of a disc, which is guided between two valve seats on a stem. The stem is connected to an expansion member serving as the temperature sensor. A conduit connected to the heater opens between the valve seats. The valve seat adjacent to the temperature sensor is included in the heating circuit and the other valve seat is included in the shunt path. The stem opens the switch means and by means of a coupling member lifts the valve closure against the action of a return spring and after a lost-motion stroke, from the valve seat adjacent to the temperature sensor.

DESCRIPTION OF THE DRAWING

The drawing is a diagrammatic representation of an embodiment of the invention.

DESCRIPTION OF A SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

A heat exchanger 1 of a water heater is supplied with heat by a gas burner 2. A heating circuit (e.g. radiators) is connected between the conduit portions 3' and 4' and is connected to the heat exchanger 1 by a forward flow conduit 3 and a return conduit 4. A circulating pump 5 is included in the return conduit 4. The forward flow conduit 3 is connected to an inlet connection 6' on the housing of a priority change-over valve assembly 6. The forward flow conduit portion 3' of the heating circuit is connected to a connection 6'' of the housing. Another connection 7' of the housing of assembly 6 is connected to a transfer conduit 7 leading through a heat exchanger 8 to the return conduit 4. The heat exchanger 8 contains a pipe coil 8' within which water for consumption is heated.

In the housing between the connections 6' and 6'', the priority change-over valve assembly 6 has a valve seat 9. Another valve seat 10 is opposite to the valve seat 9 and positioned between the connections 6' and 7'. A valve closure 11 is positioned between the valve seats 9 and 10 and is guided on a valve stem 12. The valve stem 12 has a collar 12'. The stem is connected to a temperature sensor 13, which is disposed inside the housing of priority change-over valve assembly 6 and partially exposed to the temperature of the water flowing from the forward flow conduit 3 into the connection 6'. In addition to the valve closure 11, the valve stem 12 operates electrical switches 14 and 15.

A cold water conduit 16 extends through a duct 17 of the priority change-over valve assembly 6 to a discharge connnection 17' and is connected by a conduit 17" to the pipe coil 8' of the heat exchanger 8. Water for consumption can be drawn from the heat exchanger 8 by means of a discharge valve 18. The duct 17 surrounds a major part of the temperature sensor 13.

The supply of gas to the burner 2 is controlled by a diaphragm-controlled gas valve 19 (responsive to the flow of water in return conduit 4) and by an electrically controllable gas valve 20.

The electrical power consumers consisting of the pump 5 and the solenoid of the gas valve 20 have one side thereof connected to one terminal Mp of the electric power supply system. When a main switch 21 is closed, the arrangement is ready to prepare hot water for consumption. Current now flows from the supply system terminal R through the main switch 21 and the switch 22 of a temperature limiter to two normally open contacts 23 and 24 of a room-heating switch 25 and to the electric switch 14. From the normally closed switch 14, the supply system voltage is applied to a switch 26 via a normally closed contact 24' of a room-heating switch 25. Switches 26 and 27 are closed by a diaphragm actuator 28 when there is water flow through conduit 16, i.e. when water for consumption is drawn from heat exchanger 8. Thus, when switch 26 closes (provided switches 14 and 24' are closed) electric power is applied to the circulating pump 5. At the same time power is applied to the electrically controlled gas valve 20 through the switches 27 and 15.

The room-heating switch 25 is illustrated in the position which it is in for summer operation. With this condition and with the valve stem 12 in the illustrated position, the gas burner turns on and water flows through conduits 3 and 4 when water flows through conduit 16. The hot forward flow from conduit 3 flows through the change-over valve 6 and through the heat exchanger 8 to the return conduit 4 and from the latter is supplied by the pump again to the heat exchanger 1. The cold water passing through conduit 16 flows over the sensor 13 and prevents a response to the influence of the hot forward flow water on the sensor 13 so that the priority change-over valve assembly remains in the illustrated position.

When the draw of water through conduit 16 is terminated, the switches 26 and 27 open to interrupt the supply of current to the pump and to the gas valve 20. As a result, the cooling of the temperature sensor 13 is also terminated so that the heat retained in the priority change-over valve assembly becomes effective on the sensor 13. This heat on the sensor results in the valve stem 12 being extended to initially open the switch 14. If there is further extension of the valve stem it will lift the valve member 11 from the valve seat 9 and actuate switch 15. During a renewed tapping, with switch 14 open it will prevent a flow of current to the pump 5 and to the gas valve 20 upon a renewed flow of water in conduit 16 until the action of the cold water on the sensor 13 causes the valve stem to return to its position shown. In such a return the valve closure 11 blocks valve seat 9 before switch 14 closes to start pump 5 and burner 2. As a result, hot water cannot unintendedly enter the heating circuit during a tapping of water for consumption.

The previously described sequence of operations is substantially the same as in the known systems, with the following differences:

a. The valve 9, 10, 11 and the blocking switches 14, 15 are controlled by a single temperature sensor 13.

b. Because the switch 14, operated by a temperature sensor 13, interrupts the circuit before the valve member 11 lifts from its seat 9, this arrangement may also be used as a hot-starting thermostat:

When a hot-starting switch 29 is closed (with switch 14 closed), the supply system voltage is applied to the normally closed contact 23' of the room-heating switch 25. Through switch 29 the voltage also is connected to a forward flow thermostat switch 30 and a pump selector switch 31. Through the switch 31 the voltage is applied to the circulating pump 5. Through a limiting thermostat switch 33 the voltage is applied from thermostat switch 30 to the gas valve 20. As before, when switch 14 opens the burner and the pump will be shut off. However as the temperature sensor 13 cools, the switch 14 is closed so that the circulating water is heated for a short time (until the switch 14 is opened) even though there is no flow through conduit 16 and switches 26 and 27 are open.

c. When water is tapped in a quantity which is smaller than that quantity required for a response of the diaphragm switch 28, the cooling of the temperature sensor 13 causes the switch 14 to be held in its closed position. In this case (and with hot starting switch 29 closed), the limiting thermostat 33 controls the supply of gas whereas the circulating pump 5 remains in operation. This enables the tapping of a small quantity of water. The forward flow thermostat 30 can be adjusted by the user of the heating system. When said thermostat is adjusted to a lower temperature range, the thermostat 30 rather than the forward flow thermostat 33 may control the supply of gas.

d. When a heating circuit operation is desired, the room-heating 25 is changed to its alternate position to by-pass switch 14 and apply current from switch 21 to switch 26 through switch 24. Switch 27 functions as before. Only switch 14 is rendered inactive. But with the heating circuit in operation, no means for blocking the forward flow in the heating system, such as those described hereinbefore, are required because the forward flow in the heating system is inherently hot and may be hot. This results in the decisive advantage that after a heating system operation, when the temperature sensor 13 has been extended to a large extent, the system will be energized before the switch 14 is closed so that the starting characteristic is improved.

e. When the room thermostat switch 32 is closed (with the switch 25 in its alternate position), the supply system terminal R is connected through contact 23 and by the pump selector switch 31 to the pump 5 and by the forward flow thermostat 30 and the limiting thermostat 33 to the gas valve 20. If the valve stem 12 is extended sufficiently to close the valve seat 10 by the valve closure 11, the switch 15 is connected in parallel to the limiting thermostat 33 and short-circuits the limiting thermostat. The switch 15 in connection with the limiting thermostat 33 prevents an overheating of the water for consumption in the water heater 8, 8' even when the heating circuit is in operation and a tappng is terminated by an excessive cooling of the sensor 13 so that the forward flow is conducted through the heater 8 for water consumption whereas hot water is not tapped. This condition will be maintained until the forward flow of the heating circuit becomes effective on the sensor 13 so that the valve member 11 is moved from the seat 9 to the seat 10 and the switch 15 is then switched to the contact 15'. When during that shift, the forward flow temperature rises over the value which has been selected at the limiting thermostat 33, the burner 2 will be shut down during the shifting of the valve 11.

I claim:

1. In an apparatus for use with a source of electrical power and comprising a water heater and a water flow circuit connected thereto which circuit includes a forward conduit, a return conduit, a valve assembly connected to one of said conduits, a by-pass extending from the valve assembly to the other conduit, a heat exchanger in said by-pass for heating water to be consumed, a circulating pump, a heating circuit extending from the valve assembly to the other conduit, a gas valve for controlling the generation of heat in the water heater, electrical control means including switch means connected to the pump and to the gas valve, said valve assembly including a housing, a temperature sensor in the housing and exposed to the heated water of the water flow circuit as it passes through the housing and also exposed to the cold water flowing to the heat exchanger to be heated therein, a valve in the housing having a first valve seat through which flows the water of the heating circuit, a second valve seat through which flows the water of the by-pass and valve closure means for the seats, and actuating means connecting the closure means to the sensor for closing the first valve seat when the sensor is relatively cool and for closing the second valve seat when the sensor is relatively hot, the improvement comprising:

said switch means being connected to said sensor for, in a first position, opening the valve and running the pump when the sensor is relatively cold and for, in a second position, closing the gas valve and stopping the pump when the sensor is relatively hot, said actuating means including a lost-motion connection to the closure for moving the closure from the first seat after the switch moves from the first to the second position as the sensor heats up and for moving the closure to the first seat before the switch moves from the second to the first position as the sensor cools down.

2. In an apparatus as set forth in claim 1, wherein said valve seats are opposite each other and said valve closure means is a disc between the seats, said sensor being adjacent the first valve seat, said actuating means includes a rod connected to the sensor and extending through the seats and the disc, said actuating means extending outside said housing and there being operably connected to said switch means, said actuating means including a spring resiliently urging said disc toward said first valve seat and a coupling member on said rod to move the disc away from the first seat against said urging in response to movement of the rod and after a lost motion of the rod.

3. In an apparatus as set forth in claim 2, including a conduit to the heat exchanger for water to be heated therein, and wherein said electrical control means includes a flow responsive switch means connected to said last mentioned conduit and in series with said switch means actuated by the valve assembly, means including the switch of a room thermostat electrically connected to said pump and to said gas valve, a room heating control including a switch by-passing the switch means actuated by the valve assembly and in series with the flow responsive switch means and a switch between the source of electrical power and the switch of the room thermostat.

4. In an apparatus as set forth in claim 3, including a second switch operatively connected to said sensor of the valve assembly to be in one position when said sensor is cold and in a second position when said sensor is hot, a second temperature responsive switch having a sensor responsive to the temperature in said forward conduit with the switch being in parallel with the second position of said second switch operatively connected to the sensor of the valve assembly, one side of said last-mentioned parallel connection being connected to the gas valve and the other side thereof being connected to said room thermostat switch, said one position of said second switch being in series with said gas valve and said flow responsive switch means.

5. In an apparatus as set forth in claim 4, including means comprising a manual switch connected between the first mentioned switch means and the second temperature responsive means and short circuiting the flow responsive switch means.

6. In an apparatus as set forth in claim 1, including a conduit to the heat exchanger for water to be heated therein, and wherein said electrical control means includes a flow responsive switch means connected to said last mentioned conduit and in series with said switch means actuated by the valve assembly, means including the switch of a room thermostat electrically connected to said pump and to said gas valve, a room heating control including a switch by-passing the switch means actuated by the valve assembly and in series with the flow responsive switch means and a switch between the source of electrical power and the switch of the room thermostat.

7. In an apparatus as set forth in claim 6, including a second switch operatively connected to said sensor of the valve assembly to be in one position when said sensor is cold and in a second position when said sensor is hot, a second temperature responsive switch having a sensor responsive to the temperature in said forward conduit with the switch being in parallel with the second position of said second switch operatively connected to the sensor of the valve assembly, one side of said last-mentioned parallel connection being connected to the gas valve and the other side thereof being connected to said room thermostat switch, said one position of said second switch being in series with said gas valve and said flow responsive switch means.

8. In an apparatus as set forth in claim 7, including means comprising a manual switch connected between the first mentioned switch means and the second temperature responsive means and short circuiting the flow responsive switch means.

* * * * *